United States Patent [19]

Lester et al.

[11] 3,763,328

[45] Oct. 2, 1973

[54] GAP ELIMINATION IN SCANNED RECORDINGS

[75] Inventors: Howard L. Lester, Alpaus; William C. Hughes, Scotia, both of N.Y.

[73] Assignee: General Electric Company, Schenectady, N.Y.

[22] Filed: Jan. 28, 1972

[21] Appl. No.: 221,691

[52] U.S. Cl. 179/100.2 R, 178/6.6 TC, 179/15.55 T, 179/100.2 K

[51] Int. Cl. .......................... G11b 5/44, H04n 1/22

[58] Field of Search .............. 179/100.2 T, 100.2 R, 179/100.2 MD, 15.55 T, 100.2 K; 178/6.6 TC, 6.6 A

[56] References Cited

UNITED STATES PATENTS

| | | | |
|---|---|---|---|
| 3,462,555 | 8/1969 | Presti | 179/100.2 T |
| 3,100,816 | 8/1963 | Coleman Jr. et al. | 178/6.6 TC |
| 3,321,710 | 5/1967 | Dunnican | 179/15.55 T |
| 3,504,352 | 3/1970 | Stromswold et al. | 179/15.55 T |
| 3,027,425 | 3/1962 | Tannenbaum et al. | 179/15.55 T |

*Primary Examiner*—Vincent P. Canney
*Assistant Examiner*—Alfred H. Eddleman
*Attorney*—John F. Ahern et al.

[57] ABSTRACT

In scanning signal recording systems, the information gap introduced at the end of each scan can be eliminated by utilizing time compression and expansion of the signal being recorded. During recording, the input signal is divided into time segments and time compressed into a new segment having a duration shorter than the length of a scan. During playback, the shortened segments are read out and time expanded to form a continuous signal.

8 Claims, 4 Drawing Figures

GAP ELIMINATION IN SCANNED RECORDINGS

This invention relates to recording systems, and in particular to recording systems utilizing a scanning element for storing a signal on a recording medium.

In the recording art, one means for recording electrical signals comprises a recording medium in the form of a tape and a scanning mechanism for recording the signals in a transverse direction, across the tape, as the tape is moved in a longitudinal direction. A problem arises however in this type of recording since the beam utilized in the recording must be turned around at the end of each scan across the width of the tape. During this interval, information can be lost since it takes a finite time for the beam to turn around. This problem occurs both in the raster type of scan and the zigzag scan. The raster scan is the type utlized in an ordinary television set wherein the beam records while being scanned in only one direction and is then returned to the same side of the screen before beginning the next scan.

The time it takes for the beam to turn around produces a small, though finite, discontinuity in the data being recorded. In addition to the loss of data, it is frequently desirable not to have gaps in the output signal conveying information.

Prior art attempts at solving this problem can generally be classified into two groups. The first type of solution utilizes a plurality of magnetic recording heads to which the information is sent simultaneously. During the greater part of the scan of a magnetic storage medium, only one of the magnetic recording heads will be adjacent the medium. However, at the edges of the medium, at least one additional recording head will also be adjacent the medium, thereby providing a redundant recording at the edges of successive scans so that no information is lost. However, with this type of system, there is obviously a duplication in the recorded information in addition to mechanical complications.

Another type of approach to the problem utilizes what may be described as a serpentine scan of the recording medium wherein it is attempted to turn the beam around in a finite arc without interrupting the recording of information. This approach, however, imposes rather stringent beam control requirements on the system and, in addition, does not provide a recording through the curved portions at the end of each scan that is of the same quality as the recording made in the interior portion of each scan.

In view of the foregoing, it is therefore an object of the present invention to provide a scanned recording system wherein the loss of data at the ends of the scan is eliminated.

A further object of the present invention is to provide a scanned recording system which may be read out as a continuous signal.

A further object of the present invention is to provide a data handling system wherein periodic interruptions in the data paths are obviated.

Another object of the present invention is to provide a data handling system wherein a plurality of scans can be read out as a continuous output signal with no gaps and no loss in information stored.

The foregoing objects are achieved in the present invention wherein the continuous information to be stored is broken up into a series of time segments. Each time segment is then time compressed so that successive segments are spaced by a time gap. The time length of the compressed segments corresponds to the length of a scan across the recording medium. Each segment is then recorded in its entirety on the recording medium with no loss of information. The information may be read out by time expanding each segment as it is read out to fill the time period occupied by the segment before it was processed for recording. The resultant is a continuous signal with no loss of information derived from a scanned recording medium wherein the information was recorded as a plurality of separate segments.

A more complete understanding of the present invention can be obtained by considering the following detailed description in conjunction with the accompanying drawings, in which:

FIG. 1 illustrates a preferred embodiment of the present invention wherein time compression and expansion of the information is obtained through the use of variable delay lines.

Figures 1, 3:
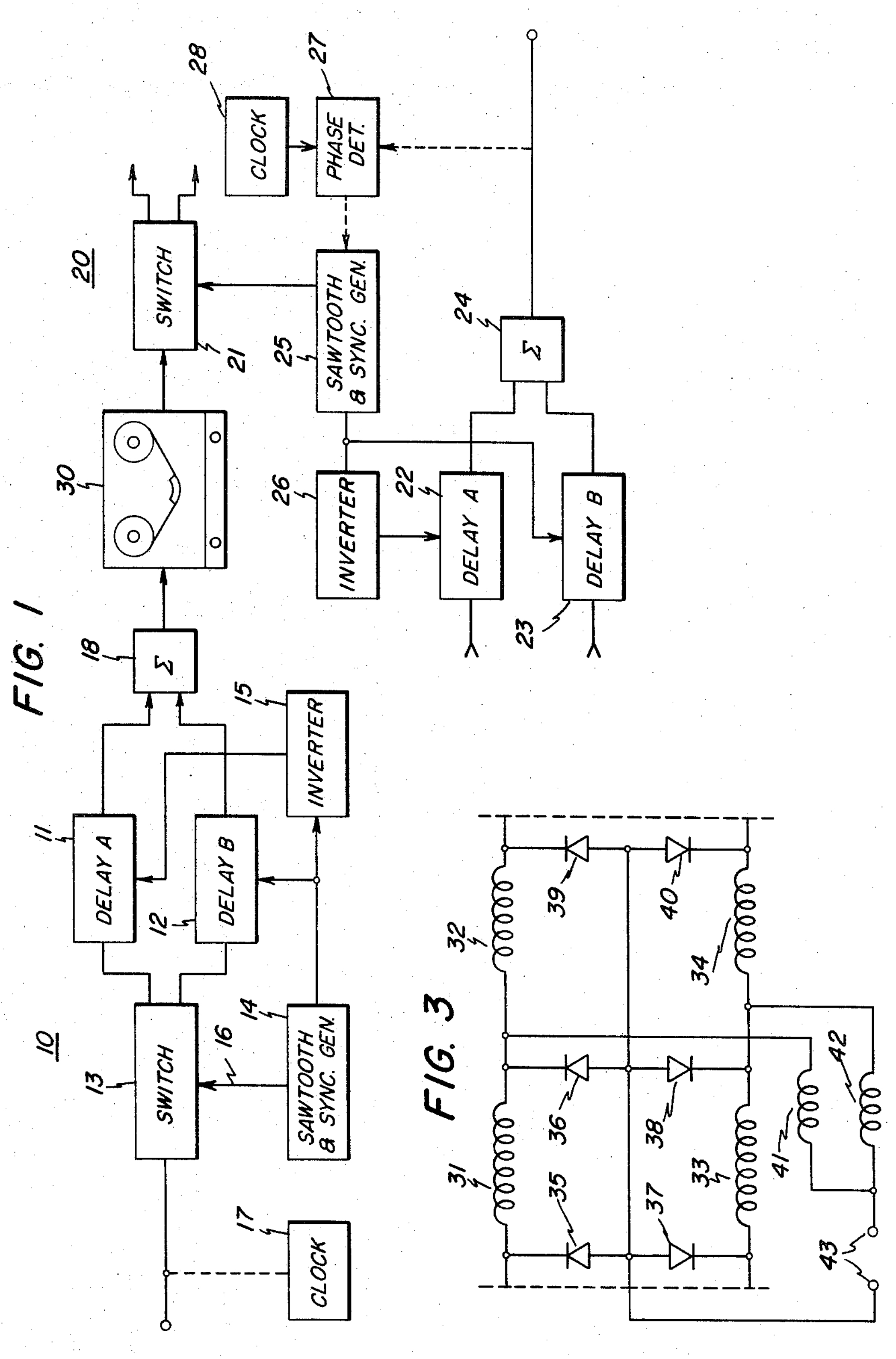
FIG. 1 illustrates one embodiment of the present invention.
FIG. 3 illustrates a voltage variable delay line as may be used in implementing the present invention.

Specifically, the preferred embodiment of the present invention can be divided up into three portions, a time compression portion 10, a recording portion 30 and a time expansion portion 20. Time compression portion 10 comprises a pair of delay lines 11 and 12 coupled to switch element 13 which is in its simplest form a single pole double throw switch that alternately couples a continuous input signal to delay line 11 or 12. The outputs of delay lines 11 and 12 are coupled to summation network 18 where they are combined.

Delay lines 11 and 12 in this embodiment of the present invention are electrically variable delay lines. That is, the amount of delay induced by either delay line 11 or 12 can be controlled by an electric signal. However, since the amount of variation is finite, a sawtooth waveform is utilized to control the variations in delay between respective upper and lower limits. This waveform is obtained from sawtooth and synchronization generator 14 which produces at one output a sawtooth waveform coupled directly to delay 12 and by way of inverter 15 to delay 11. At the other output, synchronization signals are produced that are coupled by way of line 16 to switch 13. These synchronization signals serve to switch the input to either delay 11 or 12. The changeover is made at the time the slope of the signal from generator 14 changes sign.

While a preferred embodiment of the present invention utilizes a sawtooth waveform for the sake of simplicity in making the present invention, obviously any suitable waveform can be utilized. The choice of waveform is determined by what can be faithfully reproduced as a control signal when the information is to be read out from recorder 30. If the control signals are not identical or substantially similar, then time distortions will occur in the variable delay induced under the control thereof.

Also illustrated in FIG. 1 is a source of clock signals 17 coupled as a secondary input to the system for providing a known reference signal to enable accurate recording and reading out of the information to be stored.

Recorder 30 may comprise any suitable recording mechanism such as magnetic or electrostatic recording under the control of an electron or photon beam, for example. As illustrated in FIG. 1, it will be assumed that recording element 30 comprises a tape recorder in which the information is scanned in a zigzag pattern across the width of the tape.

The time expansion portion 20 of FIG. 1 comprises a switch 21 similar to switch 13 which couples the output signals from recorder 30 to either delay 22 or delay 23. The outputs of delay elements 22 and 23 are summed in summation network 24 which produces at its output signal the reconstructed data as a continuous output signal. Controlling delay lines 22 and 23 is a sawtooth waveform produced by sawtooth and synchronization generator 25 which has its output signal coupled directly to delay line 22 and by way of inverter 26 to delay line 23. Synchronization signals are coupled from generator 25 to switch 21 to control the selection of delay line 22 or 23 at the time when the slope of the control signal changes sign.

FIG. 1 also illustrates a phase locked loop system for controlling generator 25 utilizing phase detector 27 and a source of reference clock signals 28. This phase locked loop may be added as desired to control the readout of the information from recording means 30 so as to properly reconstruct the information. The clock signals recorded from clock source 17 are phase compared in detector 27 with the clock signals from clock 28. A control signal proportional to the phase difference is coupled to sawtooth and synchronization generator 25 to vary the waveform thereof so as to provide an accurate readout of the information from recorder 30.

Figure 2:
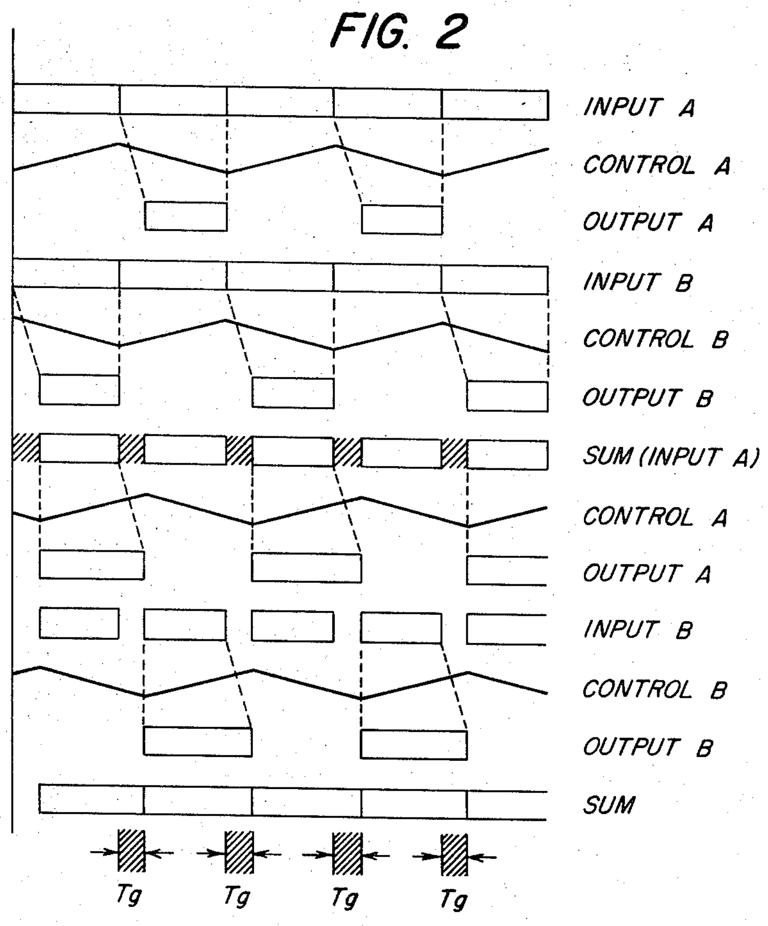
FIG. 2 illustrates wave forms useful in understanding the overall operation of the embodiment illustrated in FIG. 1.

A more complete understanding of the present invention can be obtained by considering the waveforms illustrated in FIG. 2 in conjunction with description of the operation of the elements illustrated in FIG. 1.

Input A in FIG. 2 represents a continuous signal coupled to the input of time compression stage 10. This input signal is divided into time segments by switch 13 and delay lines 11 and 12. The sawtooth waveform coupled to delay line 11 is indicated as "control A" in FIG. 2 and varies the delay introduced by delay line 11. For the sake of illustrating the present invention it will be assumed that at the minimum voltage level delay lines 11 and 12 produce zero delay and that maximum voltage produces a maximum amount of delay. In actual practice, the electrically variable delay lines exhibit a non-zero minimum delay as well, but this has no effect on the operation of the present invention and need not be considered here.

As illustrated in FIG. 2, the initial portion of the second segment of the input signal is delayed a maximum amount by delay line 11 whereas the final portion of the second segment is not delayed at all. The net effect is to shorten the second and fourth segments of "input A" to produce "output A" at the output of delay line 11. In a similar fashion, the first, third and fifth segments appearing at the input to delay line 12 are similarly shortened by delaying the initial portion of the segment a greater amount than the latter portion of the segment.

Outputs A and B represent the signals appearing at the inputs to summation network 18. Summation network 18 combines these outputs to produce a series of spaced segments having a time gap therebetween sufficiently long to enable the scanning beam to turn around and begin a subsequent scan. This combined or "sum" output signal is applied as an input to recorder 30 where it is recorded, each segment comprising a single scan of the recording medium.

The operation of time expansion stage 20 is the inverse of the operation of time compression stage 10. Specifically, switch 21 couples the output from recorder 30 to either delay line 22 or delay line 23 where they are expanded. The expanded segments are combined in summation network 24 to produce a continuous output.

Specifically, again referring to FIG. 2, the output from recorder 30 is coupled by switch 21 to either of delay lines 22 and 23 so as to apply alternate segments to each delay line. The first, third and fifth segments of "input A" are expanded in delay line 22 by increasing the delay from zero to a predetermined maximum. This is accomplished under the control of a sawtooth waveform from generator 25. The sawtooth waveform is designated "control A" in FIG. 2. Similarly, the second and fourth segments, corresponding to "input B", are expanded in delay line 23, under the control of the inverted sawtooth waveform from inverter 26, designated "control "B".

By delaying the latter parts of the segment a greater amount than the preceding part, a time expansion is accomplished that serves to return the shortened segment from recorder 30 to its original length, or to a sufficient length such that when the expanded segments are combined, a continuous output signal is formed. This combination is carried out in summation network 24 which produces an output signal that is continuous and a complete record of the input information. This output signal is designated "sum" in FIG. 2.

The operation of phase detector 27 in conjunction with clock source 28 is conventional in nature and may optionally be used with the present invention to accommodate such system variations as speed variations in the scanning device in tape recorder 30 as well as possible variations in the linearity of the sawtooth waveform produced by generator 25 as compared with the sawtooth waveform produced by generator 14. Various error detection and correction circuitry can be utilized with the present invention, or the specific error detection apparatus illustrated in FIG. 1 may be omitted if desired.

As previously noted, the waveforms from generators 14 and 25 need not be sawtooth, that is a linearly varying voltage, but may comprise any desired waveform that fulfills two criteria; (1) that the segments into which the information is divided is not uniformly delayed throughout its entire duration and (2) that the waveform be reproducable so that generators 14 and 25 produce virtually identical waveforms so that the respective delay lines are similarly controlled. Otherwise, time distortions will be introduced into the stream of information.

As illustrated in FIG. 2, the apparatus of the present invention introduces a uniform time gap without losing any information so that the beam can be redirected to a new scan path without loss of information. Further, time expansion portion 20 can be utilized to convert any periodically interrupted data stream into a continuous output by time expanding each segment to fill the duration from the end of one segment to the beginning of the next.

For information streams that are aperiodically interrupted, an additional delay line can be utilized so that the information is slightly delayed. An interruption in the delay is then anticipated by sensing apparatus operating in "real time". Thus, when a gap in the information is sensed by the sensing apparatus, a time expansion can be made utilizing portion 20.

Conversely, time compression portion 10 can be utilized to compress information that might otherwise be lost due to a lapse in a communication channel. As with the case involving aperiodic interruption of the information stream, the information is delayed in time so that sense apparatus has an opportunity to detect a lapse in the communication channel and can then compress the information during the time period involved so that no information is lost until the communication channel is restored or another channel selected.

FIG. 3 illustrates an example of a voltage control delay line that can be utilized in the system of the present invention. Generally, the delay line comprises a plurality of sections repeating the pattern illustrated in FIG. 3 in which backbiased diodes exhibiting voltage variable capacitance are utilized to obtain a variable delay.

Specifically, in FIG. 3, a network interconnecting a pair of input and output terminals comprises inductances 31–34 and diodes 35–40. Diodes 35–40 are backbiased through inductances 41 and 42 which interconnect a central terminal and the outside lines of the network. The control voltage applied at terminals 43 variably reverse biases the diodes so that the capacitance exhibited by the diode varies in accordance with the control voltage.

Figure 4:
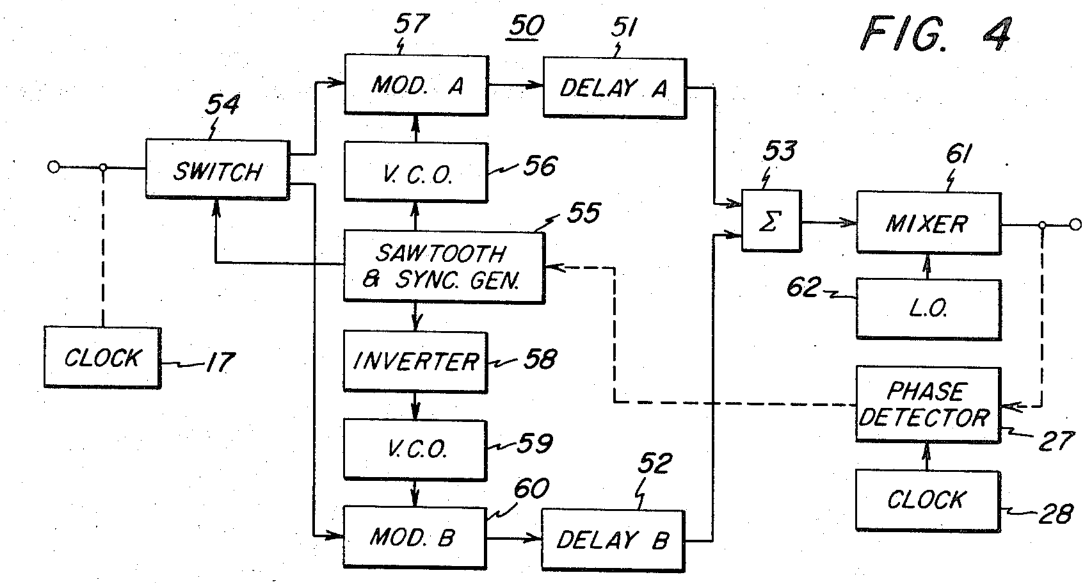
FIG. 4 illustrates an alternative embodiment of the present invention utilizing a different type of delay line.

FIG. 4 illustrates an alternative embodiment of the present invention utilizing what is known in the art as dispersive delay lines to obtain a variable delay of the segments of information applied thereto. As is known, dispersive delay lines exhibit a delay that varies with the frequency of the applied signal. Thus, the embodiment of FIG. 4 is essentially similar to the embodiment of FIG. 1, except that instead of varying the characteristics of the delay line, the characteristics of the applied signal are varied to obtain the same result. As noted in connection with FIG. 1, the same two requirements are made of the operation of the delay line of FIG. 4. Specifically, the delay lines must variably delay the segment of information applied thereto during at least a portion of the duration of the segment. Secondly, that the control waveform utilized to obtain the variable delay be reproducible so that the information can be reconstructed into a continuous data stream.

Specifically, in FIG. 4, circuit 50 can be utilized as either a time compression or a time expansion system depending upon which portion of the sawtooth waveform is utilized as a control signal. Thus, circuit 50 is not repeated as a time compression portion and a time expansion portion as in FIG. 1 which illustrates an entire system. It should be noted with respect to FIG. 1, that the circuitry, while illustrated as being duplicated, need not be in actual practice and that the same circuitry can be used for either expansion or compression, depending upon the portion of the sawtooth waveform utilized.

Circuit 50 comprises dispersive delay lines 51 and 52 having the outputs thereof summed by summation network 53 for recombining the alternate segments from the two delay lines. Assuming a continuous input signal is applied at the input terminal of circuit 50, switch 54 divides the continuous input signal into segments under the control of a synchronization signal from sawtooth and synchronization generator 55. Alternate segments are applied to modulator 57 which modulates this signal with a signal from voltage controlled oscillator 56. Voltage controlled oscillator 56 is controlled by the sawtooth waveform from generator 55.

Similarly, alternate segments of the input signal are applied to modulator 60 which modulates the signal with a frequency from voltage controlled oscillator 59, under the control of an inverted sawtooth waveform derived from generator 55 by way of inverter 58. The outputs of modulators 57 and 60 comprise sweep frequency signals which are applied respectively to delay lines 51 and 52. Due to the dispersive nature of these delay lines, signals not of the same frequency are not delayed the same amount. This is, the delay is frequency dependent.

When circuit 50 is operating in a time compression mode the variable frequency output from modulators 57 and 60 is such that the initial portion of the segment is delayed a greater amount than the latter portion of the segment, as illustrated in FIG. 2 by "output A" and "output B". The alternate time compressed segments are then combined in summation network 53 and applied to mixer 61 where they are reduced in frequency to the original frequency value of the information by local oscillator 62. At the output terminal of circuit 50, there is produced a plurality of segments of information separated by time gap $T_g$ in the same manner as the output from the circuitry illustrated in FIG. 1.

The operation of circuit 50 in the time expansion mode is similar and simply uses the portion of the sawtooth control waveform having a slope of opposite sign as that utilized in the time compression mode of operation. When this is done, the output of modulators 57 and 60 is a variable frequency signal, the variations in frequency being such that the delay through delay lines 51 and 52 delays the latter portion of the segment a greater amount than the initial portion. Thus, each segment is time expanded so as to fill the time gaps $T_g$. These expanded segments are then combined in summation network 53 where a continuous output stream is obtained. The frequency of the output signal from summation network 53 is then returned to the level of the original information by mixer 61 and local oscillator 62.

Also illustrated in FIG. 4, are clock 17, phase detector 27 and clock source 28. These elements provide the same phase lock loop function in conjunction with sawtooth and synchronization generator 55 as provided by the same apparatus in FIG. 1.

It should be noted that the output from circuit 50 in the time compression or expansion mode is identical to the output signal obtained by either time compression stage 10 or time expansion 20 of FIG. 1. That is, if so desired, one could utilize time compression stage 10 from FIG. 1 and circuit 50 from FIG. 4 in a time expansion mode to read out the scanned information and reconstruct it into a continuous information stream.

Dispersive delay lines 51 and 52 may take a variety of forms, as for example a delay line operated near the cutoff frequency of the delay line, at which point the delay exhibited by the delay line becomes highly frequency dependent. In its simplest form, delay lines 51 and 52 may comprise wave guides operating near cut-off for signals in the microwave region. In such a case, in order to time compress a segment, the initial portion of the signal is made higher in frequency than the latter portion of the signal since the wave guide has a low frequency cutoff point. Other dispersive delay lines may also be used such as ultrasonic and surface wave delay lines.

Having thus described one embodiment of the invention, it should be apparent to those of skill in the art that various modifications can be made without departing from the spirit and scope of the present invention. For example, the summation networks utilized in the embodiments of the present invention are only one example of suitable apparatus that may be used in conjunction with the present invention. For example, a synchronous switch may be utilized in the place of the summation network. The operation of the synchronous switch would also be under the control of the sawtooth and synchronization generator. Since the primary function of this element is that it recombine the segments from the delay lines, a variety of equivalent elements are possible. Similarly, non-magnetic recording media may be used in carrying out the present invention, for example, optical and electrostatic recording.

What we claim as new and desire to secure by Letters Patent of the United States is:

1. Apparatus for eliminating gaps in continuous information recorded as a series of scans comprising:

first switch means for dividing said information into two channels wherein each channel contains alternate time segments;

first variable delay means coupled to said switch means for time compressing each segment;

recording means coupled to said first delay means for recording each compressed segment as a scan on a recording medium;

second variable delay means coupled to the output of said recording means for time expanding each scan to form a plurality of time expanded segments;

control means, coupled to said switch means and said first and second variable delay means, for synchronously varying the delay exhibited the first and second delay means with the actuation of said switch means; and means for combining said time expanded segments into a continuous information signal.

2. Apparatus as set forth in claim 1 wherein said first and second variable delay means each comprise a voltage variable delay line and said control means comprises a sawtooth generator.

3. Apparatus as set forth in claim 1 wherein said first and second variable delay means comprise a pair of dispersive delay lines exhibiting a frequency dependent delay characteristic and said control means comprises:

waveform generator means for producing a variable voltage output signal;

voltage controlled oscillator means coupled to said waveform generator means for producing a variable frequency output signal; and mixer means coupled to said voltage controlled oscillator for combining said segments with said variable frequency output signal and coupling the combined signals to said dispersive delay lines.

4. Apparatus as set forth in claim 3 wherein said waveform generator means comprises a sawtooth waveform generator.

5. Apparatus for recording continuous information in discrete segments comprising:

switch means receiving said information for dividing said information into two channels wherein each channel contains alternate time segments;

a pair of voltage variable delay lines connected one each to said channels for receiving alternate time segments from said switch means;

control means for producing a variable output voltage coupled to said delay lines for delaying the initial portion of each segment a greater amount than the terminal portion to time compress each segment;

combining means coupled to said delay lines for combining the alternate time compressed segments into a single signal comprising said time compressed segments and time gaps of predetermined width therebetween; and recording means for recording said combined signal.

6. Apparatus for producing a continuous information signal from a discontinuous, segmented information signal comprising:

a pair of voltage variable delay lines;

switch means receiving said segmented information for switching alternate segments into one or the other of said pair of delay lines;

control means for producing a variable output voltage coupled to said delay lines for delaying the initial portion of each segment a lesser amount than the terminal portion to time expand each segment; and combining means coupled to said delay lines for combining the alternate, time expanded segments into a continuous information signal.

7. The method for eliminating gaps in continuous information recorded as a series of scans comprising the steps of:

dividing said continuous information into a plurality of time segments;

separating said time segments into two channels of information wherein alternate time segments are in each channel;

time compressing each segment by delaying an initial portion of each segment more than the remainder of that segment;

combining said channels to produce discontinuous information; and recording each compressed segment as a complete scan on a recording medium.

8. The method as set forth in claim 7 further comprising the steps of:

reading out the compressed segments from said recording medium;

separating said segments into two channels of information wherein alternate segments are in each channel;

time expanding each segment by delaying an initial portion of each segment less than the remainder of that segment; and combining the segments to form continuous information.

* * * * *